(12) United States Patent
Forsyth (10) Patent No.: US 8,091,939 B2
(45) Date of Patent: Jan. 10, 2012

(54) AIR BAG COMPATIBLE VEHICLE PARTITION

(75) Inventor: Gilbert H. Forsyth, Whitestown, IN (US)

(73) Assignee: Pro-gard Products, LLC, Indianapolis, IN (US)

( * ) Notice: Subject to any disclaimer, the term of this patent is extended or adjusted under 35 U.S.C. 154(b) by 0 days.

(21) Appl. No.: 12/728,987

(22) Filed: Mar. 22, 2010

(65) Prior Publication Data

US 2010/0237646 A1  Sep. 23, 2010

Related U.S. Application Data (60) Provisional application No. 61/162,499, filed on Mar. 23, 2009.

(51) Int. Cl.
*B60R 21/12* (2006.01)

(52) U.S. Cl. .................. 296/24.4; 296/24.42; 296/24.46; 280/749

(58) Field of Classification Search .................. 296/24.4, 296/24.42, 24.46; 280/749
See application file for complete search history.

(56) References Cited

U.S. PATENT DOCUMENTS

| | | | |
|---|---|---|---|
| 2,865,670 A * | 12/1958 | Dunn | 296/24.42 |
| 2,884,279 A | 4/1959 | Halstead et al. | |
| 2,997,331 A | 8/1961 | Kudner | |
| 3,002,784 A | 10/1961 | Bagg | |
| 3,015,515 A | 1/1962 | Halstead et al. | |
| 3,044,800 A | 7/1962 | Wicker | |
| 3,169,781 A | 2/1965 | Abruzzino | |
| 3,190,687 A | 6/1965 | Johnson | |
| 3,214,211 A | 10/1965 | Setina | |
| 3,397,005 A | 8/1968 | May et al. | |
| 3,423,121 A | 1/1969 | Lipkin | |
| 3,441,309 A | 4/1969 | Halstead et al. | |
| 3,510,164 A | 5/1970 | Setina | |
| 3,525,535 A | 8/1970 | Kobori | |
| 3,666,313 A | 5/1972 | Halstead et al. | |
| 3,667,801 A | 6/1972 | Setina | |
| RE27,942 E | 3/1974 | Setina | |
| 3,931,994 A | 1/1976 | Palmiter | |
| 4,015,875 A | 4/1977 | Setina | |
| 4,035,014 A | 7/1977 | Sellers | |
| 4,173,369 A | 11/1979 | Roggin | |

(Continued)

FOREIGN PATENT DOCUMENTS

DE  2 045 871  9/1970

(Continued)

OTHER PUBLICATIONS

Pro-Gard Pro-Cell Model P1000 FD Series Installation Instructions 1998-2001 P71 Crown Victoria, 11 pgs.

(Continued)

*Primary Examiner* — Glenn Dayoan
*Assistant Examiner* — Gregory Blankenship
(74) *Attorney, Agent, or Firm* — Baker & Daniels LLP (57) ABSTRACT

A security partition for use in a vehicle having side curtain air bags is shown. The partition includes a frame. The frame in combination with the vehicle defines a cavity. The side curtain air bags are configured to deploy and occupy the cavity. A side wing is configured to be fastened to the frame. The side wing includes a body, and an air bag director. The plane of the air bag director is angled relative to the plane of the body.

19 Claims, 11 Drawing Sheets

U.S. PATENT DOCUMENTS

| | | | |
|---|---|---|---|
| 4,595,227 A | 6/1986 | Setina | |
| 4,621,856 A | 11/1986 | McKenzie | |
| 4,708,384 A | 11/1987 | LaRosa | |
| 4,919,467 A | 4/1990 | Guimelli | |
| 4,964,666 A * | 10/1990 | Dillon | 296/24.46 |
| 4,971,378 A | 11/1990 | Setina | |
| 5,058,941 A | 10/1991 | Solomon et al. | |
| 5,340,183 A | 8/1994 | Horian | |
| 5,529,341 A | 6/1996 | Hartigan | |
| 5,536,057 A * | 7/1996 | Stewart | 296/24.46 |
| 5,735,564 A * | 4/1998 | Coogan | 296/24.43 |
| 5,820,187 A | 10/1998 | Ament et al. | |
| 5,848,817 A | 12/1998 | Niehaus | |
| 5,906,410 A | 5/1999 | Dalinkiewicz | |
| 6,004,084 A | 12/1999 | Möker | |
| 6,012,753 A | 1/2000 | Ordoyne et al. | |
| 6,056,038 A | 5/2000 | Foster et al. | |
| 6,059,313 A * | 5/2000 | Coogan et al. | 280/749 |
| 6,086,128 A | 7/2000 | Whitehead, Sr. | |
| 6,155,621 A | 12/2000 | Nishida et al. | |
| 6,217,096 B1 | 4/2001 | Koiwa et al. | |
| 6,250,700 B1 | 6/2001 | Traxler | |
| 6,286,882 B1 | 9/2001 | Rastettler | |
| 6,349,986 B1 | 2/2002 | Seel et al. | |
| 6,364,389 B1 | 4/2002 | Beigel | |
| 6,502,859 B1 | 1/2003 | Svetlik | |
| 6,554,339 B1 | 4/2003 | Moore | |
| 6,669,259 B2 | 12/2003 | Murray et al. | |
| 6,827,382 B2 * | 12/2004 | Murray et al. | 296/24.46 |
| 6,983,969 B2 * | 1/2006 | Murray et al. | 296/24.4 |
| 6,983,970 B2 | 1/2006 | Bateman | |
| 7,195,297 B2 * | 3/2007 | Murray et al. | 296/24.4 |
| 7,380,853 B2 * | 6/2008 | Wells | 296/24.4 |
| 7,726,688 B2 * | 6/2010 | Setina | 280/748 |
| 7,806,452 B2 * | 10/2010 | Storer et al. | 296/24.43 |
| 2001/0033084 A1 | 10/2001 | Murray et al. | |
| 2002/0043811 A1 | 4/2002 | Sotiroff et al. | |
| 2007/0176450 A1 * | 8/2007 | Setina | 296/24.46 |
| 2007/0228756 A1 * | 10/2007 | Wells | 296/24.4 |
| 2010/0237646 A1 * | 9/2010 | Forsyth | 296/24.46 |

FOREIGN PATENT DOCUMENTS

| | | |
|---|---|---|
| DE | 195 46 646 A1 | 6/1996 |
| DE | 299 22 989 U1 | 4/2000 |
| DE | 101 55 695 A1 | 5/2003 |
| NL | 7604715 A | 11/1977 |
| NL | 1024182 | 3/2005 |
| WO | WO 2005/115795 | 12/2005 |

OTHER PUBLICATIONS

Setina Mfg. Co., Inc., "Quality-Innovation-Commitment" advertising, Police Fleet Manager, Mar.-Apr. 2008, 2 pgs.

The Body Guard Police Vehicle Equipment 1999 brochure from Setina Manufacturing; pp. 1-6.

The Body Guard Police Vehicle Equipment 2000 brochure from Setina Manufacturing; pp. 1-9.

The Body Guard Police Vehicle Equipment 2001 brochure from Setina Manufacturing; pp. 1-9.

Setina Partition Installation Instructions, 1992-2004 Ford Crown Victoria—clamping Bracket, 5 pgs.

Troy Prisoner Partitions brochure from Troy Products; 1995; 3 pages.

Troy Stash-N-Stow™ Partitions brochure from 1998; pp. 26-29.

* cited by examiner

AIR BAG COMPATIBLE VEHICLE PARTITION

CROSS-REFERENCE TO RELATED APPLICATION

This application claims priority to U.S. Provisional Patent Application Ser. No. 61/162,499, filed Mar. 23, 2009, the disclosure of which is expressly incorporated by reference herein.

BACKGROUND AND SUMMARY OF THE INVENTION

The present disclosure relates generally to a vehicle security partition which forms a barrier between the front and rear occupant areas of a vehicle. More particularly, the present disclosure relates to support structures and mounting devices for vehicle partitions.

Vehicle partitions are often utilized to separate the front and rear occupant areas of vehicles, such as police cars and taxi cabs, in order to prevent access to the front occupant area by someone located in the rear occupant area. These partitions typically include a dividing panel located between the front and rear occupant areas which forms a barrier between the front and rear occupant areas.

Many vehicles typically used in law enforcement are now equipped with side air bags. One category of side air bags is designed to reduce the risk of injury to an occupant's head and/or neck in the event of an accident. When triggered to deploy, these side air bags inflate to occupy spaces located generally along the inner side surfaces of the vehicle, including the side windows and frame members. These side air bags deploy in an effort to prevent or lessen injury from an occupant's impact with these surfaces.

Certain side air bags loosely resemble a curtain window covering (referred to as "side curtain air bags"). Side curtain air bags can be designed to extend substantially the length of the interior, and particularly the length of the front and rear windows, when deployed. These side curtain air bags can extend from an area near the forward end of the front window rearward past the center pillar (often called the B-pillar, i.e., the portion of the body separating the front and rear doors), along the rear door and in some cases, beyond the rear door. Side curtain air bags are typically configured to deploy from the roof of the vehicle above the side windows. Other side air bags may be designed to deploy from the seats.

Conventional partitions have surrounding frames designed to fit closely to the sides and roof of the vehicles to reduce the chance that an occupant in the rear occupant area can reach around the partition with his hand or an implement to reach the front occupant area. Proper functioning of side curtain air bags, however, typically requires unrestricted spaces adjacent to the windows and the B-pillar to allow full inflation upon deployment.

According to an illustrative embodiment of the present disclosure, a security partition for use in a vehicle having side curtain air bags is shown. The partition includes a frame. The frame in combination with the vehicle defines a cavity. The side curtain air bags are configured to deploy and occupy the cavity. A side wing is configured to be fastened to the frame. The side wing includes a body, and an air bag director. The plane of the air bag director is angled relative to the plane of the body.

According to a further illustrative embodiment of the present disclosure, a security partition for use in a vehicle having side curtain air bags includes a frame, wherein the frame in combination with the vehicle defines a cavity. The side curtain air bag is configured to deploy and occupy the cavity. A plurality of bendable mounting brackets each include a first mounting flange, a second mounting flange, and an arm connecting the first mounting flange with the second mounting flange. The first mounting flange is secured to the frame. A side wing includes a body, an air bag director angled relative to the body, and a mounting ledge angled relative to the body. The second mounting flange of each of the mounting brackets is secured to the mounting ledge of the side wing.

According to another illustrative embodiment of the present disclosure, a side wing assembly for use with a security partition in a vehicle includes a plurality of bendable mounting brackets including a first mounting flange, a second mounting flange, and an arm connecting the first mounting flange with the second mounting flange. A side wing includes a body, an air bag director angled relative to the body, and a mounting ledge angled relative to the body. An extension extends from the body and is configured to contact a B-pillar of the vehicle and includes a seat belt notch for providing clearance for a seat belt assembly associated with the B-pillar. The second mounting flange of each of the mounting brackets is secured to the mounting ledge of the side wing.

BRIEF DESCRIPTION OF THE DRAWINGS

The detailed description of the drawings particularly refers to the accompanying figures in which.

DETAILED DESCRIPTION OF THE DRAWINGS

Figure 1:
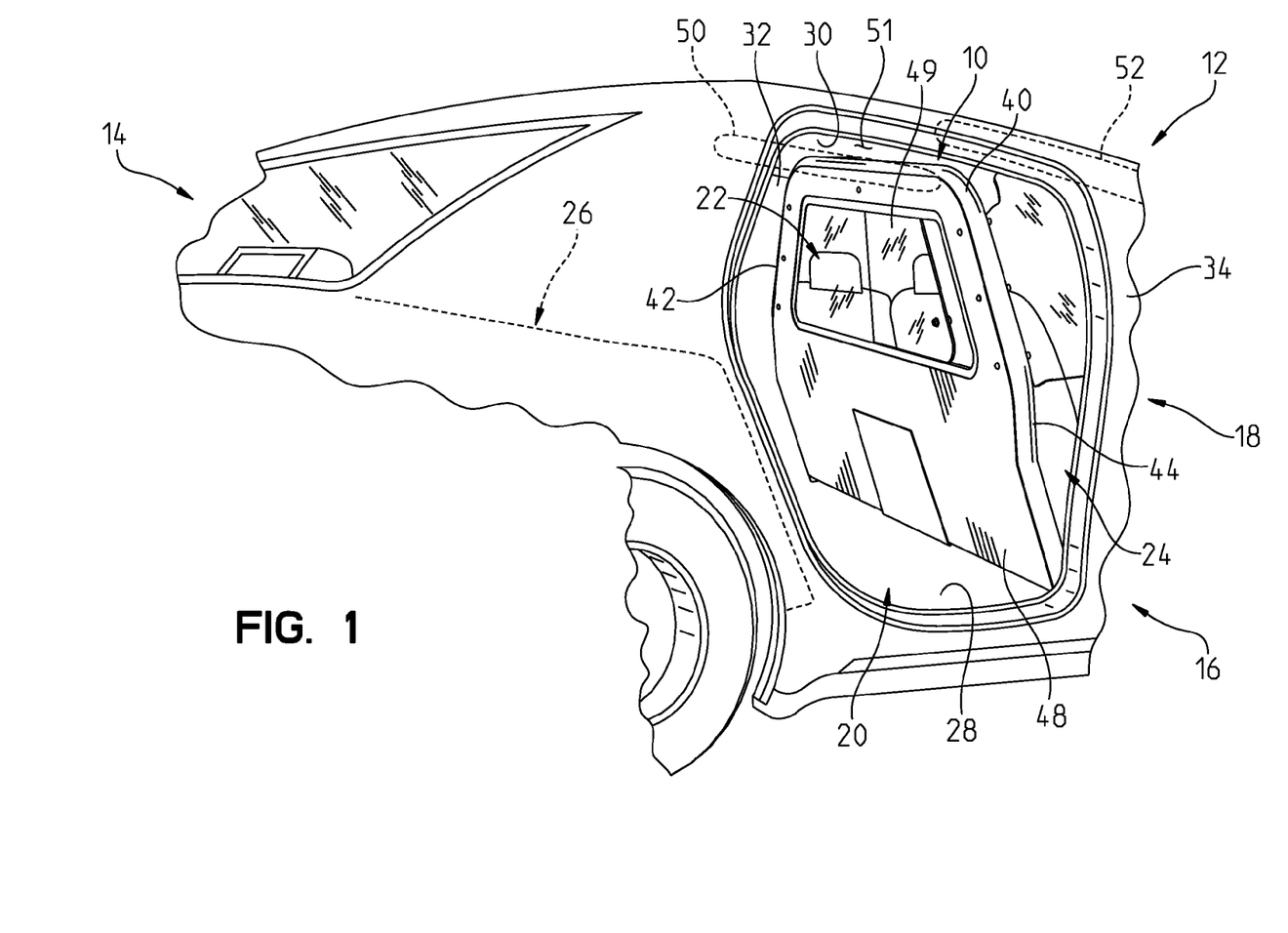
FIG. 1 is a partial perspective view with a cut-away, illustrating a security partition of the present disclosure in a typical installation within a vehicle.

Referring now to the drawings, FIG. 1 illustrates an embodiment of the security partition 10 of the present disclosure as installed in a conventional vehicle 12. The vehicle 12 may comprise any conventional automobile including, but not limited to, a police car or a taxicab. The vehicle 12 illustratively includes longitudinally extending driver and passenger sides 14 and 16 and laterally extending front and rear occupant areas 18 and 20. The front occupant area 18 illustratively includes a conventional driver seat 22 proximate the driver side 14 of the vehicle 12 and a conventional passenger seat 24 positioned proximate the passenger side 16 of the vehicle 12. The front seats 22 and 24 comprise individually adjustable, or bucket seats. The security partition 10 of FIGS. 1-3 will find equal applicability with other seating arrangements, including conventional bench seats.

Figure 8:
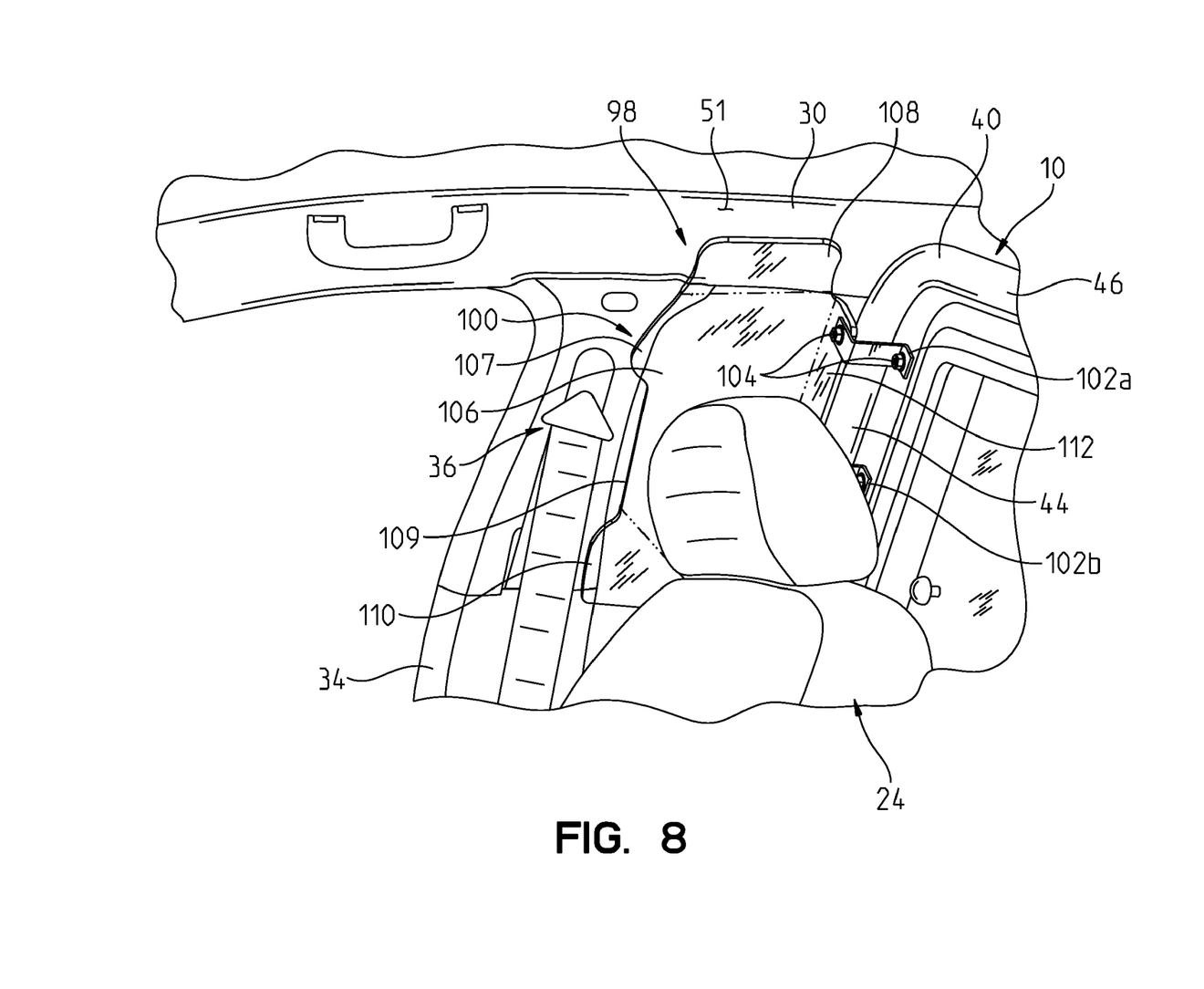
FIG. 8 is a perspective view from front occupant area illustrating the side wing of FIG. 4 in a normal mode.

The rear occupant area 20 illustratively includes a conventional rear bench seat 26 extending laterally between the driver side 14 and passenger side 16 of the vehicle 12. The vehicle 12 further includes a floor 28 and a roof 30 supported by a plurality of pillars, including laterally spaced door or "B" pillars 32 and 34 disposed proximate the driver and passenger sides 14 and 16, respectively. The pillars 32 and 34 extend between the floor 28 and the roof 30, and are generally positioned intermediate the front and rear occupant areas 18 and 20. A seat belt assembly 36 is illustratively supported by each pillar 32 and 34 (FIG. 8). The security partition 10 is installed between the front and rear occupant areas 18 and 20 in order to form a barrier and protect occupants in the front driver and passenger seats 22 and 24 from a person transported in the rear seat 26.

The security partition 10 of FIGS. 1-4 illustratively includes a frame 40 including a pair of uprights 42 and 44 extending vertically upwardly above the floor 28 of the vehicle 12. An illustrative embodiment security partition 10 is disclosed in U.S. Pat. No. 7,195,297, issued Mar. 27, 2007, which is expressly incorporated by reference.

Driver side upright 42 is illustratively positioned laterally proximate the driver pillar 32, while passenger side upright 44 is illustratively positioned laterally proximate the passenger pillar 34. The frame 40 further illustratively includes a laterally extending upper member 46 supported by the pair of uprights 42 and 44. The uprights 42 and 44 and the upper member 46 may be formed from an integral tubular steel member bent into a substantially U-shaped rollbar which is inverted such that the uprights 42 and 44 extend downwardly from the upper member 46. A protective sleeve or cover 47 may be received over a portion of the frame 40 in order to protect the vehicle occupants and to provide an enhanced contact surface with the roof 30 of the vehicle 12. As such, the cover 47 is illustratively formed of a durable and resilient material, such as foam rubber, plastic or polymeric material. A protective panel 48 is supported by the frame 40 and may include a window pane 49.

The security partition 10, as illustrated, extends across driver side 14 and passenger side 16 extending from pillar 32 to pillar 34 (i.e. substantially the full width of the rear occupant area 20). The disclosure of FIGS. 1-4 will find equal applicability with other partitions, such as a partial width security partition which extends across either the driver side 14 or the passenger side 16. The security partition 10 may be secured to the vehicle 12 using conventional devices, such as clamps or brackets coupling uprights 42 and 44 to pillars 32 and 34, respectively.

The vehicle 12 also illustratively includes longitudinally extending side curtain air bags 50 and 52 typically supported by roof 30 and laterally spaced adjacent to pillars 32 and 34. Side curtain air bags 50 and 52 are typically positioned beneath a headliner 51 and are configured to deploy or inflate from roof 30 downward. Opposing ends of the side curtain air bags 50 and 52 are positioned forward and rearward of pillars 32 and 34. Uprights 42 and 44 of partition 10 may vertically taper away from alignment with pillars 32 and 34 to provide enough space for deployment of side curtain air bags 50 and 52 (i.e., air bag deployment spaces). The air bag deployment space needs to remain clear of partition 10 prior to deployment of side curtain air bags 50 and 52 to prevent interference therewith.

Figure 2:
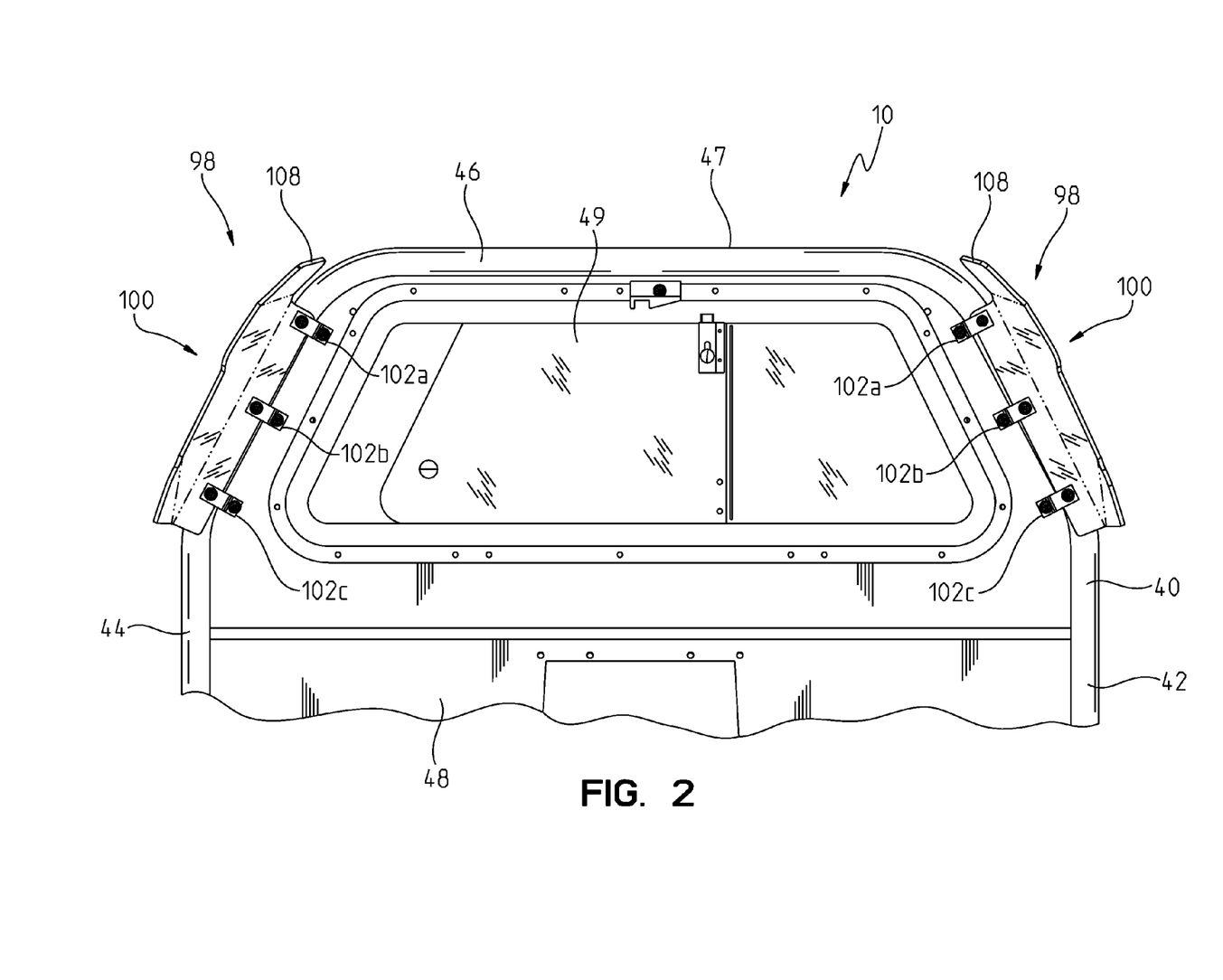
FIG. 2 is a partial front elevational view of the security partition of FIG. 1.
Figure 3:
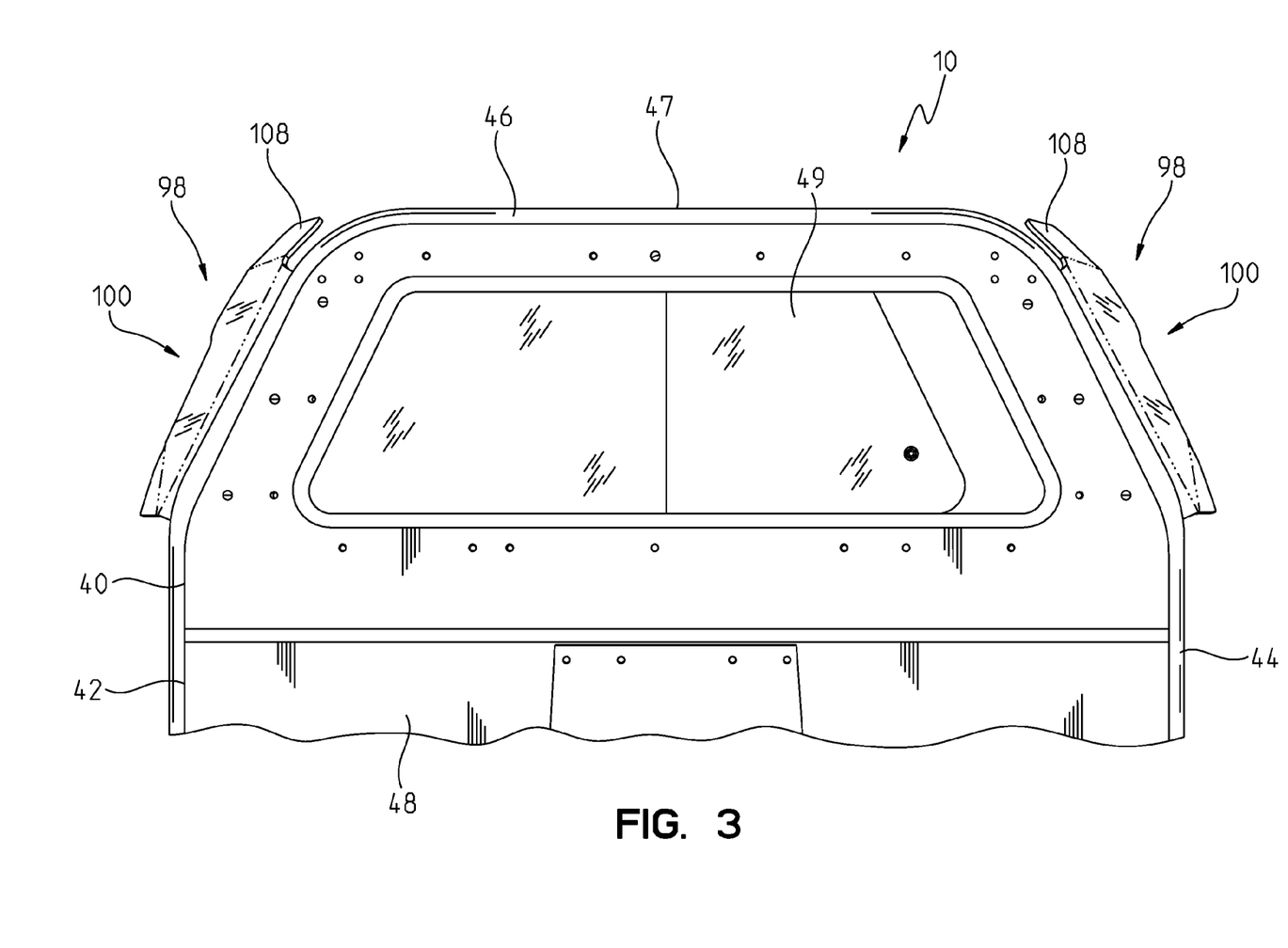
FIG. 3 is a partial rear elevational view of the security partition of FIG. 1.
Figure 4:
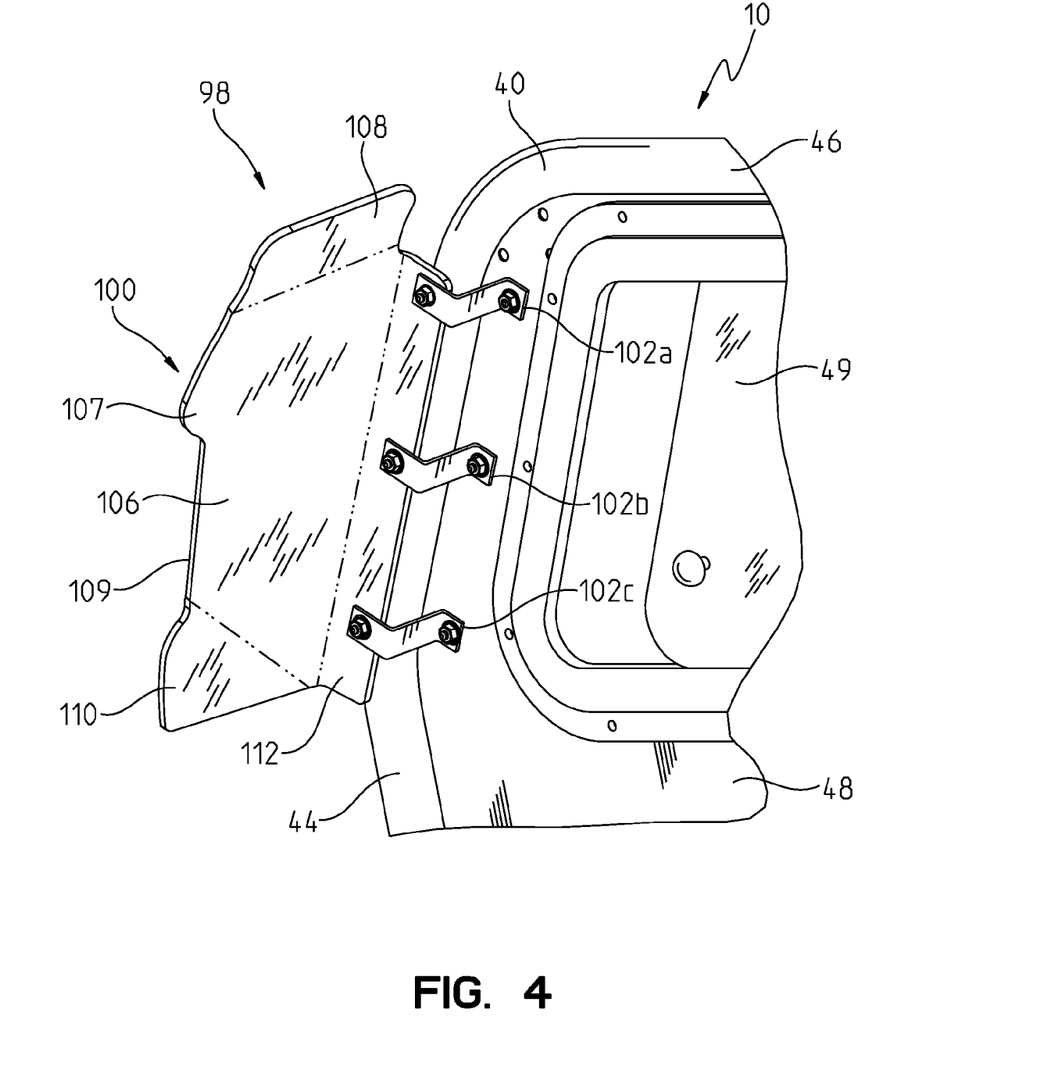
FIG. 4 is a front detail perspective view of a security partition illustrating a side wing assembly of the present disclosure.

As illustrated in FIGS. 2-4, side wing assemblies 98 are operably coupled to opposing sides of the partition 10 to fill the air bag deployment spaces between the partition 10 and the pillars 32 and 34. The assemblies 98 illustratively include side wings 100 fastened to brackets 102a, 102b, 102c by fasteners 104, where brackets 102 are supported by partition 10. For a full width partition, a pair of side wing assemblies 98 may be supported adjacent to side curtain air bags 50 and 52 on opposite sides of the vehicle 12.

Figure 5:
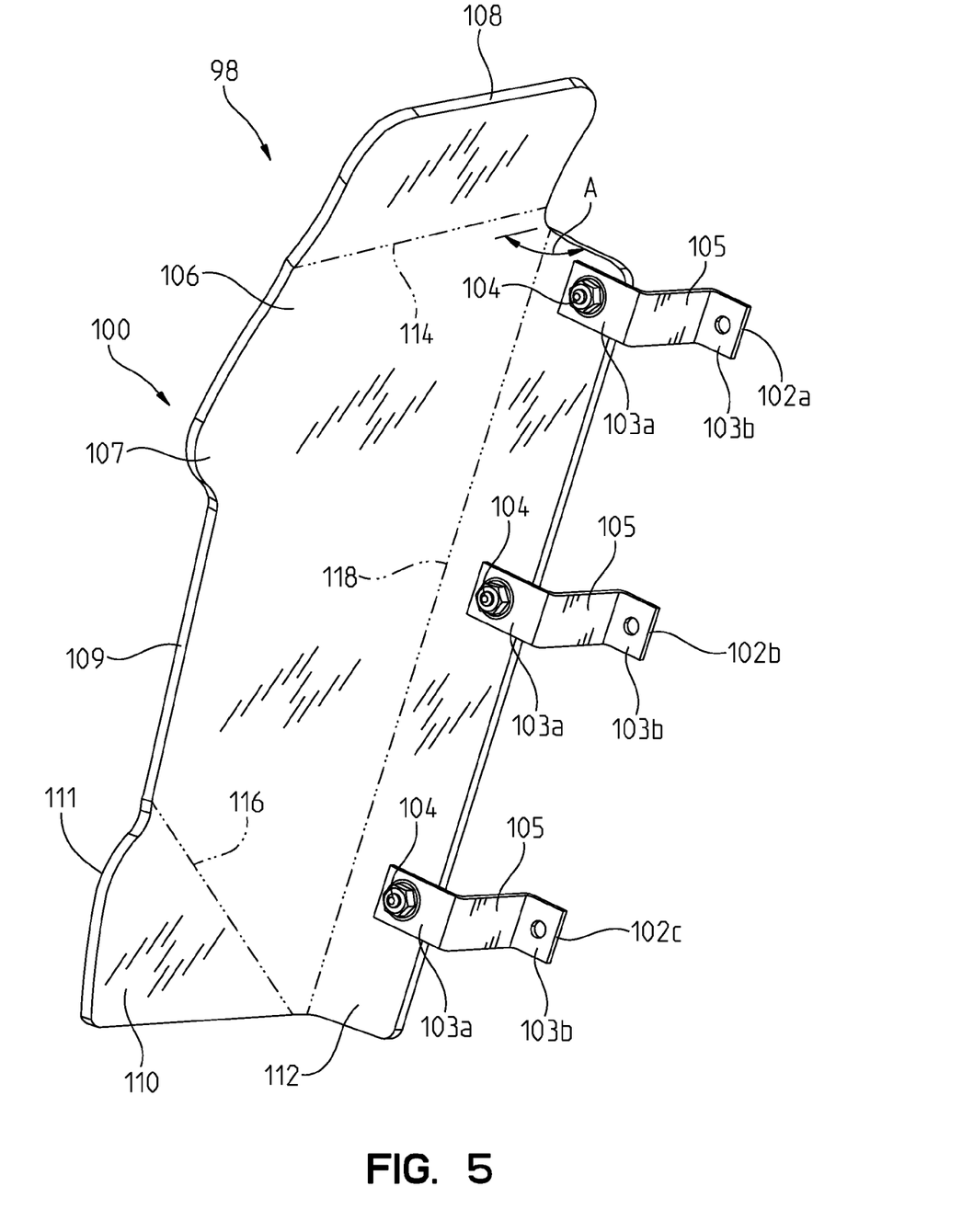
FIG. 5 is a first front perspective view of the side wing assembly of FIG. 4.
Figure 6:
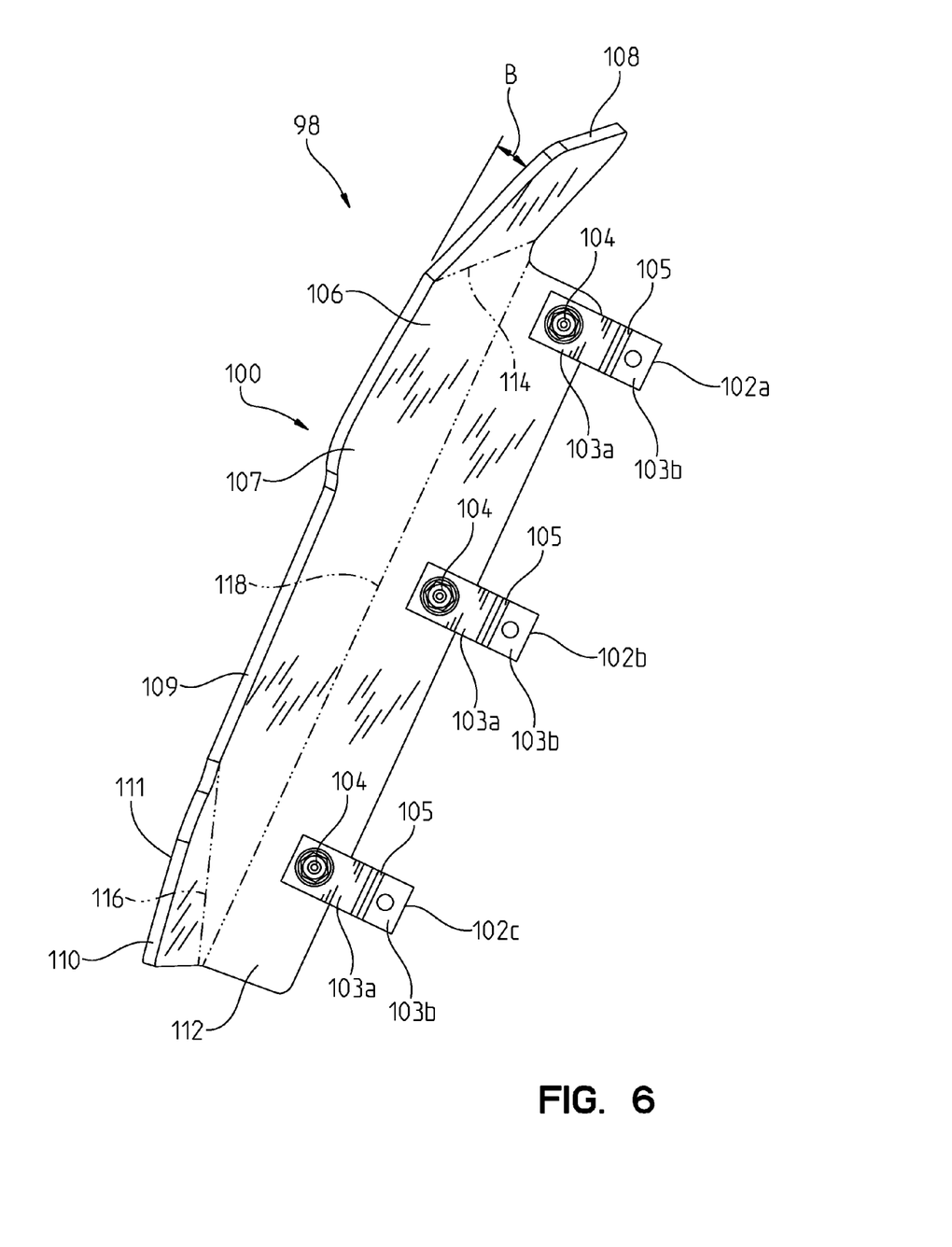
FIG. 6 is a second front perspective view of the side wing of FIG. 4.
Figure 7:
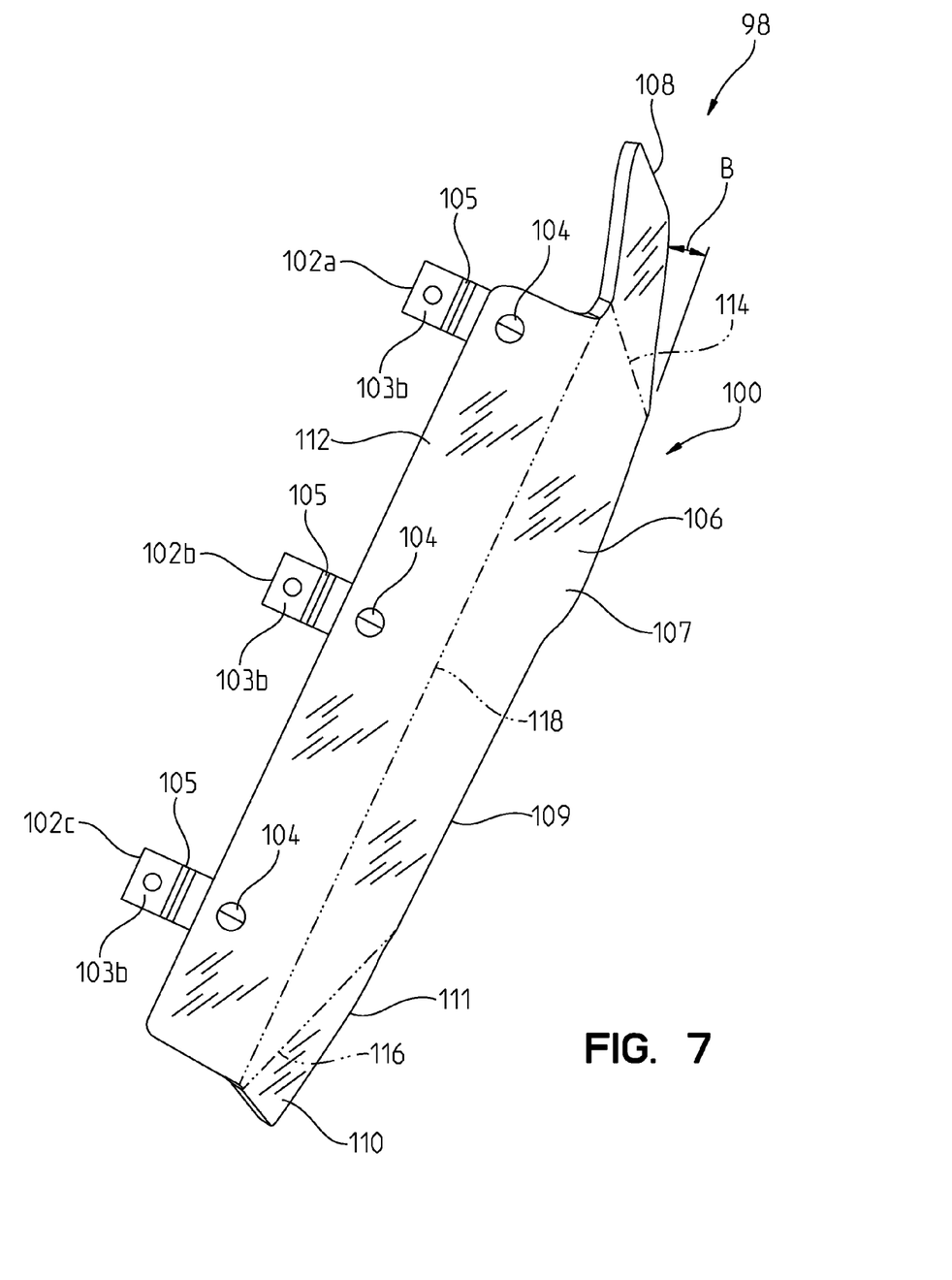
FIG. 7 is a rear perspective view of the side wing assembly of FIG. 4.

With reference to FIGS. 5-7, each bracket 102 includes a pair of mounting flanges 103a and 103b connected by an arm 105. Fasteners 104 extend through the mounting flanges 103a and 103b to secure the bracket 102 to the side wing 100 and the partition 10, respectively. Each bracket 102 is adapted for positioning adjacent to the forward surface of partition 10 and adjacent to either upright 42 or 44 of partition 10. Bracket 102 may be deflected to bend side wing 100 toward front occupant area 18 based on force applied to side wing 100 such as deployment of side curtain air bags 50 or 52. More particularly, the relative angular positions of the mounting flanges 103a and 103b relative to the arm 105 may vary as force is applied to the side wing 100. Bracket 102 may be of the type well known in the art and may be formed of stamped metal.

As further illustrated in FIGS. 5-7, side wing 100 includes body 106, air bag director 108 extending vertically upwardly from body 106, and extension 110 extending lateral and downward away from body 106. Side wing 100, including body 106, is illustratively formed of a ⅛" thick polymer. In one illustrative embodiment, body 106, air bag director 108, and extension 110 are integrally formed of a transparent polycarbonate. The material is preferably resilient enough to prevent a rear occupant from gaining access to the front occupant area. The material is also preferably flexible enough to permit bending in light of deployment of the side curtain air bags 50 and 52. A projection 107 extends from the body 106 for contacting pillar 32, 34. Body 106 defines seat belt notch 109 which provides space for seat belt assembly 36 on respective pillar 32, 34.

As illustrated, side wing 100 includes mounting ledge 112 where mounting brackets 102 fasten to side wing 100. Ledge 112 is angled relative to body 106, as illustrated by Angle A (FIG. 5). Angle A may be approximately forty degrees (40°) to approximately eighty-five degrees (85°) depending upon several environmental factors such as the make and model of vehicle 12, the location, design, and orientation of pillar 32, 34, and the amount of force desired to be exerted upon the pillar 32, 34 by wing 100. Bend 118 marks the division between body 106 and ledge 112 defined by angle A. Bend 118 may deform based on force applied to side wing 100 such as deployment of side curtain air bags 50 or 52 (FIG. 1).

Side wing 100 illustrates bend 116 which marks the division between body 106 and extension 110. Extension 110 is angled relative to body 106 so side wing 100 fits tightly between partition 10 and pillars 32 or 34. More particularly, extension 110 includes projection 111 which contacts pillar 32, 34.

With further reference to FIGS. 5-7, air bag director 108 is angled out of the plane of body 106. Side wing 100 illustrates bend 114 which marks the division between body 106 and director 108. Air bag director 108 is angled relative to body 106, as illustrated by Angle B (FIGS. 6 and 7). Angle B may be approximately twenty degrees (20°) to approximately fifty degrees (50°) depending upon environmental factors such as the make and model of vehicle 12, and the location and design of headliner 51. One side of director 108 is positioned to interact with headliner 51 (FIG. 8) when side curtain air bags 50 and 52 (FIG. 1) deploy. Headliner 51 covers side curtain air bags 50 and 52 (FIG. 1) prior to deployment. Headliner 51 illustratively remains between side curtain air bags 50 and 52 and director 108 during deployment. Director 108 illustratively causes side wing 100 to remain toward the front occupant area 18 during deployment of side curtain air bags 50 and 52 (FIG. 1). Director 108 may also substantially prevent side wing 100 from impeding deployment of side curtain air bags 50 and 52.

As illustrated in operation, side curtain air bags 50 and 52 deploy downward and adjacent to pillars 32 and 34, respectively, as well as adjacent to partition 10. As illustrated in FIGS. 8-11, side wing assembly 98 is shown between pillar 34 and partition 10. FIG. 8 shows the side wing assembly 98 in a normal or resting mode prior to deployment of side curtain air bag 50. Side wing 100 is illustrated as exerting a preload force upon pillar 32, 34. The preload force is sufficient to substantially prevent a rear occupant from gaining access to the front occupant area by passing his hand between the side wing 100 and the cooperating pillar 32, 34.

Figure 9:
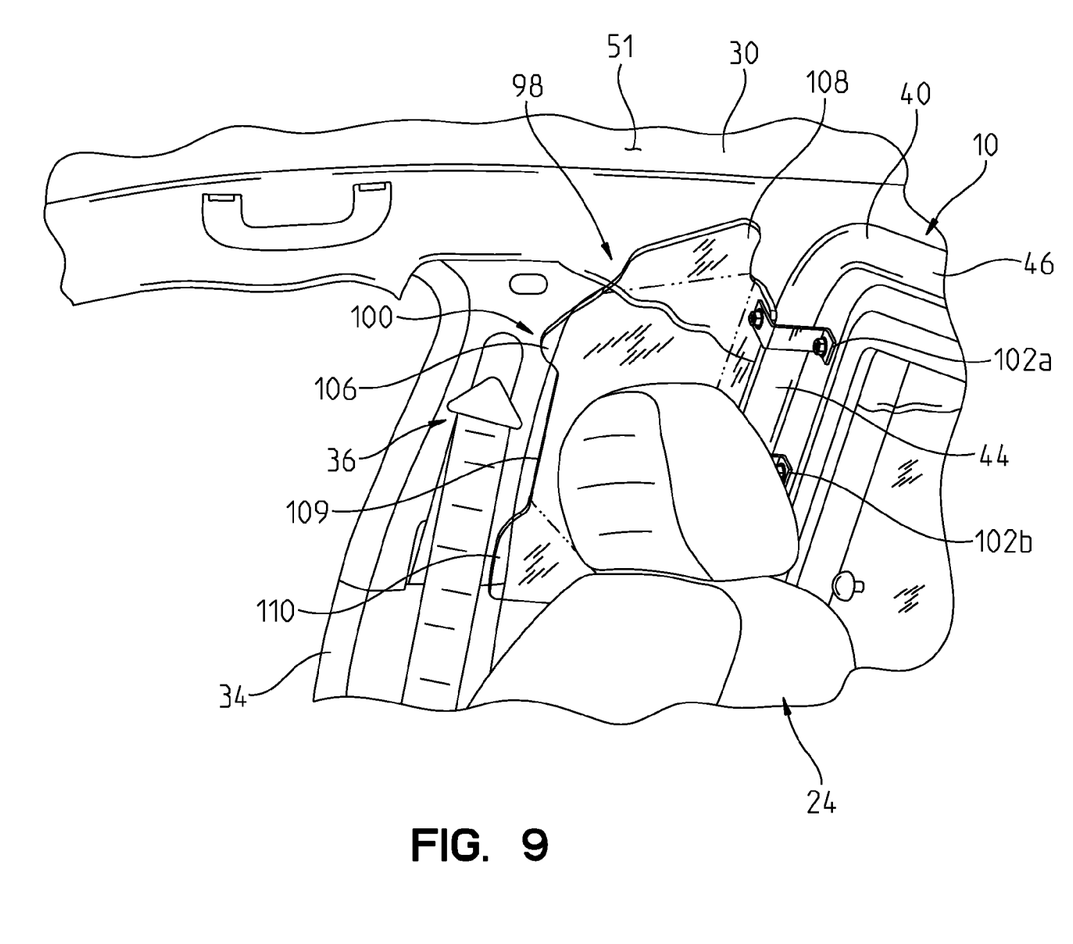
FIG. 9 is a perspective view from front occupant area illustrating the side wing of FIG. 4 in a first partially deflected mode.
Figure 10:
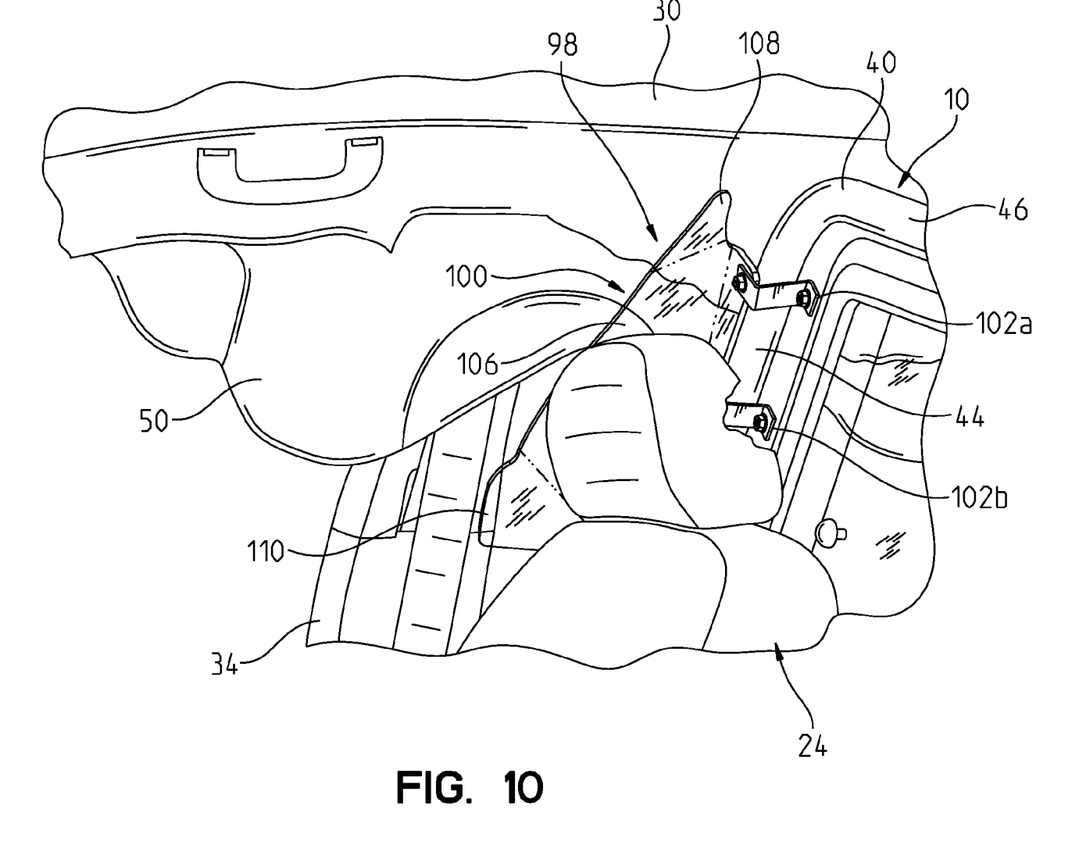
FIG. 10 is a perspective view from front occupant area illustrating the side wing of FIG. 4, with the side curtain air bag partially deployed and the side wing in a second partially deflected mode.
Figure 11:
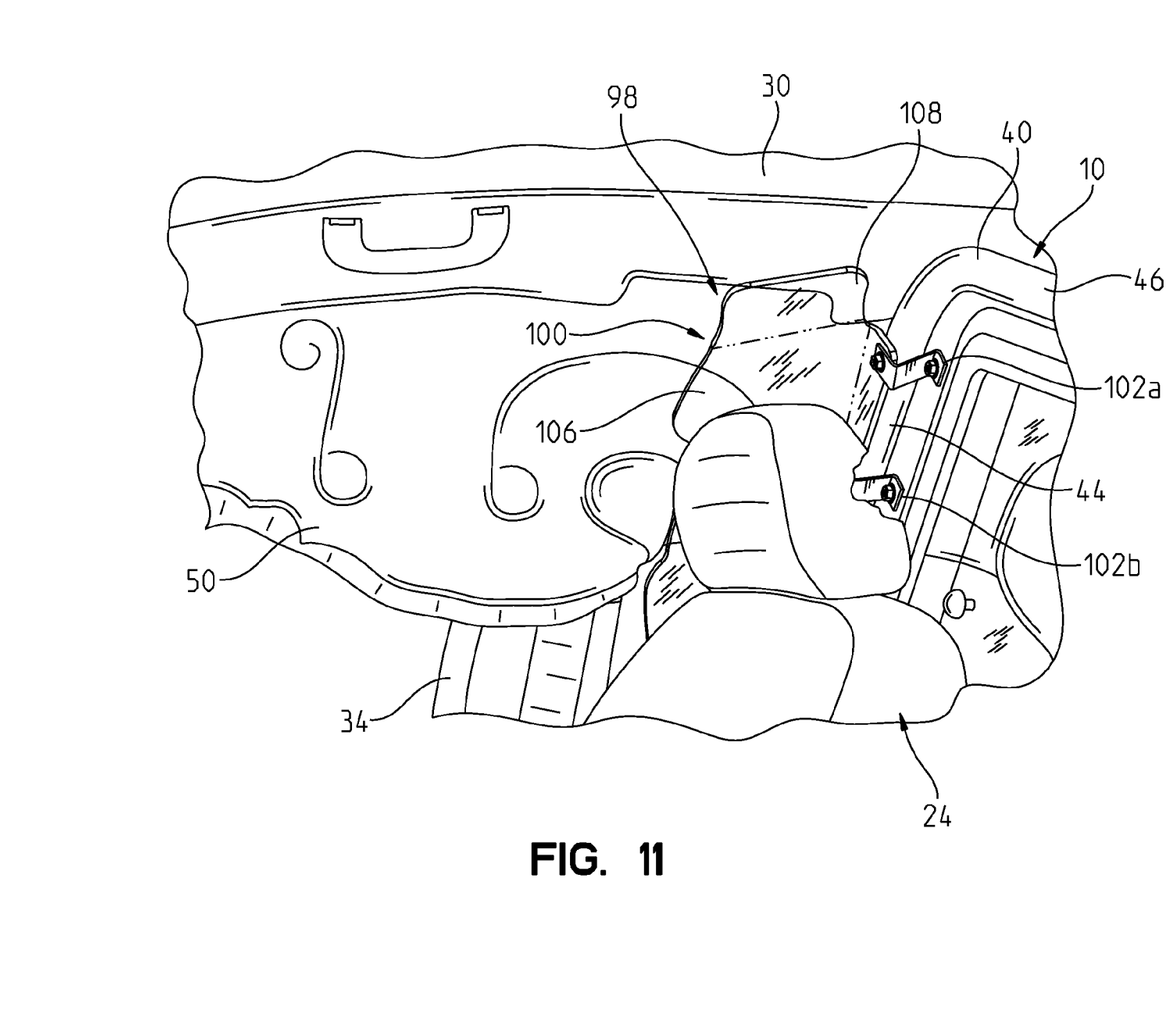
FIG. 11 is a perspective view from front occupant area illustrating the side wing of FIG. 4, with the side curtain air bag fully deployed and the side wing in a fully deflected mode.

FIG. 9 illustrates the side wing assembly 98 in an initial deployment mode, just after the start of deployment of the air bag 50. Side wing 100, especially body 106, is deformed by interaction with side curtain air bag 50. Air bag director 108 causes force from the air bag 50 to bend the side wing 100 while directing side wing 100 toward the center line of vehicle 12. As shown in FIG. 9, the brackets 102 have not started to bend. FIG. 10 shows the side wing assembly 98 in a mid-deployment mode, approximately half-way through full deployment of the air bag 50. Side wing 100 has been moved forward and inwardly from the resting position. Upper bracket 102a is bent but remains fastened to both side wing 100 and partition 10. The middle and lower brackets 102b and 102c illustratively have not started to bend. Finally, FIG. 11 illustrates side wing assembly 98 in a full deployment mode, upon full deployment of side curtain air bag 50. Side wing 100 is moved forward from resting position. Body 106 is providing force against side curtain air bag 50. Upper and middle brackets 102a and 102b are bent but still retain side wing 100 fastened to partition 10.

During installation of side wing 100, the flanges 103a of brackets 102 are secured onto ledge 112 of side wing 100 by fasteners 104. Brackets 102 are then positioned along partition 10 as shown in FIG. 4. Finally, flanges 103b of brackets 102 are secured to partition 10 through fasteners 104.

Although the disclosure has been described in detail with reference to certain preferred embodiments, variations and modifications exist within the spirit and scope of the disclosure as described and defined in the following claims.

The invention claimed is:

1. A security partition for use in a vehicle having side curtain air bags, the partition comprising:
   a frame, the frame in combination with the vehicle defining a cavity, the side curtain air bags configured to deploy and occupy the cavity; and
   a side wing configured to be fastened to the frame, the side wing including:
      a body, and
      an air bag director extending vertically upwardly from the body, the plane of the air bag director angled relative to the plane of the body and angled relative to the plane of the frame, such that one side of the air bag director is configured to interact with a side curtain air bag upon deployment for directing the side wing toward a center line of the vehicle.

2. The security partition of claim 1, wherein the side wing is formed of a polymer.

3. The security partition of claim 2, wherein the side wing is formed of polycarbonate having a thickness of approximately ⅛ inch.

4. A security partition for use in a vehicle having side curtain air bags, the partition comprising:
   a frame, the frame in combination with the vehicle defining a cavity, the side curtain air bags configured to deploy and occupy the cavity; and
   a side wing configured to be fastened to the frame, the side wing including:
      a body, and
      an air bag director the plane of the air bag director angled relative to the plane of the body, wherein the air bag director is angled from between 20 degrees and 50 degrees from the body of the side wing.

5. A security partition for use in a vehicle having side curtain air bags, the partition comprising:
   a frame, the frame in combination with the vehicle defining a cavity, the side curtain air bags configured to deploy and occupy the cavity; and
   a side wing configured to be fastened to the frame, the side wing including:
      a body;
      an air bag director the plane of the air bag director angled relative to the plane of the body;
      a plurality of bendable mounting brackets; and
   wherein the side wing further comprises a mounting ledge, the mounting brackets securing the mounting ledge to the frame.

6. The security partition of claim 5, wherein the mounting ledge is angled from between 40 degrees and 85 degrees from the body of the side wing.

7. A security partition for use in a vehicle having side curtain air bags, the partition comprising:
   a frame, the frame in combination with the vehicle defining a cavity, the side curtain air bags configured to deploy and occupy the cavity; and
   a side wing configured to be fastened to the frame, the side wing including:
      a body;
      an air bag director the plane of the air bag director angled relative to the plane of the body; and
   wherein the side wing further comprises an extension extending from the body and configured to contact a B-pillar of the vehicle.

8. A security partition for use in a vehicle having side curtain air bags, the partition comprising:
   a frame, the frame in combination with the vehicle defining a cavity, the side curtain air bags configured to deploy and occupy the cavity; and
   a side wing configured to be fastened to the frame, the side wing including:
      a body;
      an air bag director the plane of the air bag director angled relative to the plane of the body; and
   wherein the body of the side wing includes a seat belt notch for providing clearance for a seat belt assembly associated with a B-pillar of the vehicle.

9. The security partition for use in a vehicle having side curtain air bags, the partition comprising:
   a frame, the frame in combination with the vehicle defining a cavity, the side curtain air bag configured to deploy and occupy the cavity;

a plurality of bendable mounting brackets each including a first mounting flange, a second mounting flange, and an arm connecting the first mounting flange with the second mounting flange, the first mounting flange secured to the frame; and a side wing including:
    a body,
    an air bag director angled relative to the body,
    a mounting ledge angled relative to the body;
wherein the second mounting flange of each of the mounting brackets is secured to the mounting ledge of the side wing.

10. The security partition of claim 9, wherein the air bag director is angled from between 20 degrees and 50 degrees from the body of the side wing.

11. The security partition of claim 10, wherein the mounting ledge is angled from between 40 degrees and 85 degrees from the body of the side wing.

12. The security partition of claim 9, wherein the side wing further comprises an extension extending from the body and configured to contact a B-pillar of the vehicle.

13. The security partition of claim 9, wherein the side wing is formed of a polymer.

14. The security partition of claim 13, wherein the side wing is formed of polycarbonate having a thickness of approximately ⅛ inch.

15. The security partition of claim 9, wherein the body of the side wing includes a seat belt notch for providing clearance for a seat belt assembly associated with a B-pillar of the vehicle.

16. A side wing assembly for use with a security partition in a vehicle, the assembly comprising:
a plurality of bendable mounting brackets each including a first mounting flange, a second mounting flange, and an arm connecting the first mounting flange with the second mounting flange; and
a side wing including:
    a body,
    an air bag director angled relative to the body,
    a mounting ledge angled relative to the body, and
    an extension extending from the body and configured to contact a B-pillar of the vehicle and including a seat belt notch for providing clearance for a seat belt assembly associated with the B-pillar;
wherein the second mounting flange of each of the mounting brackets is secured to the mounting ledge of the side wing.

17. The side wing assembly of claim 16, wherein the body, the air bag director, and the extension of the side wing are integrally formed of a polymer.

18. The side wing assembly of claim 17, wherein the side wing is formed of a polycarbonate having a thickness of approximately ⅛ inch.

19. The side wing assembly of claim 16, wherein the air bag director is angled from between 20 degrees and 50 degrees from the body of the side wing, and the mounting ledge is angled from between 40 degrees and 85 degrees from the body of the side wing.

\* \* \* \* \*